United States Patent
Gilstad et al.

(10) Patent No.: US 8,403,337 B1
(45) Date of Patent: Mar. 26, 2013

(54) MULTIFUNCTION RING

(76) Inventors: Barbara C. Gilstad, San Antonio, TX (US); Dennis W. Gilstad, San Antonio, TX (US)

( * ) Notice: Subject to any disclaimer, the term of this patent is extended or adjusted under 35 U.S.C. 154(b) by 0 days.

(21) Appl. No.: 13/616,098

(22) Filed: Sep. 14, 2012

Related U.S. Application Data

(63) Continuation-in-part of application No. 13/525,391, filed on Jun. 18, 2012, now Pat. No. 8,292,301, which is a continuation-in-part of application No. 13/456,235, filed on Apr. 26, 2012, now Pat. No. 8,276,918, which is a continuation-in-part of application No. 13/184,965, filed on Jul. 18, 2011, now Pat. No. 8,210,542.

(51) Int. Cl.
*F16J 15/00* (2006.01)

(52) U.S. Cl. ......... 277/567; 277/605; 277/645; 277/647

(58) Field of Classification Search .................. 277/567, 277/605, 644, 645, 647, 333, 553, 558
See application file for complete search history.

(56) References Cited

U.S. PATENT DOCUMENTS

| | | | |
|---|---|---|---|
| 829,546 | A | 8/1906 | Schou |
| 3,617,589 | A | 11/1971 | Jones-Hinton et al. |
| 3,951,849 | A | 4/1976 | Vickery et al. |
| 4,103,909 | A | 8/1978 | Hoffman et al. |
| 4,269,419 | A | 5/1981 | Brant |
| 4,300,775 | A | 11/1981 | Ringel |
| 4,572,519 | A | 2/1986 | Cameron et al. |
| 4,759,428 | A | 7/1988 | Seshimo |
| 4,852,533 | A | 8/1989 | Doncker et al. |
| 5,183,863 | A | 2/1993 | Nakamura et al. |
| 5,580,068 | A | 12/1996 | Gundy |
| 5,629,503 | A | 5/1997 | Thomasen |
| 5,639,098 | A | 6/1997 | MacDonald |
| 5,799,953 | A | 9/1998 | Henderson |
| 6,129,485 | A * | 10/2000 | Grabe et al. .................. 405/152 |
| 6,432,320 | B1 | 8/2002 | Bonsignore et al. |
| 6,701,529 | B1 | 3/2004 | Rhoades et al. |
| 6,713,438 | B1 | 3/2004 | Baillargeon et al. |
| 6,719,302 | B2 * | 4/2004 | Andrick ........................ 277/604 |
| 7,608,314 | B2 | 10/2009 | Plant |
| 7,794,827 | B2 | 9/2010 | Palmer et al. |
| 7,847,057 | B2 | 12/2010 | Muller et al. |
| 7,942,603 | B2 | 5/2011 | Miller |
| 2010/0148452 | A1* | 6/2010 | Westhoff et al. .............. 277/605 |
| 2012/0025471 | A1 | 2/2012 | Andrick et al. |

* cited by examiner

*Primary Examiner* — Vishal Patel
(74) *Attorney, Agent, or Firm* — Dennis W. Gilstad

(57) ABSTRACT

A multifunction ring symmetrical about a longitudinal axis has an elastomeric body, first and second ends, and inner and outer surfaces. The elastomeric body totally encloses at least one pair of longitudinally-spaced circumferential tubular cavities, each pair of cavities being mutually connected via a fluid flow restrictor and substantially filled with at least one fluid medium. Each fluid flow restrictor is responsive to longitudinal compression of the elastomeric body, and the fluid medium facilitates heat conduction, vibration damping, extrusion blocking and/or fluid pressure transmission. Longitudinal compression of a multifunction ring on a pump pressure stroke increases tubular cavity fluid pressure and causes substantially symmetrical radial ring expansion. Radial ring expansion is both inward and outward, thus reducing fluid flow resistance in the fluid flow restrictor. Periodic reduction of pumped fluid pressure tends to reverse radial ring expansion, thus reducing both frictional ring wear and heat generation.

17 Claims, 4 Drawing Sheets

MULTIFUNCTION RING

This application is a continuation-in-part of co-pending application Ser. No. 13/525,391, filed 18 Jun. 2012, which is a continuation-in-part of application Ser. No. 13/456,235, filed 26 Apr. 2012 (U.S. Pat. No. 8,276,918, issued 2 Oct. 2012) which was a continuation-in-part of application Ser. No. 13/184,965, filed 18 Jul. 2011 (U.S. Pat. No. 8,210,542, issued 3 Jul. 2012), all incorporated by reference.

FIELD OF THE INVENTION

The invention relates generally to circular seals and seal assemblies.

BACKGROUND

Certain pumps, such as those for oil field use, are typically designed in two sections, the (proximal) power section (herein "power end") and the (distal) fluid section (herein "fluid end"). The power end usually comprises a crankshaft, reduction gears, bearings, connecting rods, crossheads, crosshead extension rods, etc. The fluid end of such a pump comprises a housing which in turn comprises one or more functional units, each functional unit comprising a suction valve, a discharge valve, a bore or cylinder, and a piston (e.g., in mud pumps) or plunger (e.g., in fracking pumps), plus packing assemblies, high-pressure seals, etc.

Conventional plunger pumps employ a housing member (i.e., a packing box) containing plunger packing assemblies analogous to packing assemblies shown in U.S. Pat. No. 4,572,519, incorporated herein by reference and referred to subsequently as the '519 patent. Within a packing assembly one or more packing rings having corresponding chevron-shaped ends are retained and compressed between a proximal brass (or bronze) adapter ring and a distal adapter ring.

The packing rings have chevron-shaped ends (sometimes termed "chevron-shaped packing rings") and are relatively stiff, comprising, for example, layered fabric-reinforced rubber. Each ring end's chevron shape arises from a concave or convex circumferential feature which is an extension of their layered construction, allowing modest radial expansion under longitudinal compression to achieve a tight seal around a plunger. Longitudinal compression force, in turn, is provided by a gland nut and by the cyclically increased pressure of the pumped fluid.

Turning the gland nut adjusts longitudinal preload (i.e., longitudinal compressive force) that is applied to the packing ring(s) to prevent excessive cyclic movement under load and to achieve a desired seal around the plunger. But even after reducing longitudinal preload to zero by backing out the gland nut, packing rings typically remain tightly sealed around the plunger because of their stiffness. Thus, the plunger must virtually always be withdrawn from the packing box to allow removal of the packing ring(s), as may be required during pump maintenance. Plunger withdrawal, however, is generally difficult because of interference between the plunger and various power end components.

The above maintenance issues arise in conventional plunger pumps because designers make the packing rings relatively stiff, while still flexible enough under longitudinal compression to achieve a tight seal around the plunger. Sealing against fluid leakage, however, requires that the packing rings substantially retain their functional (chevron) end shape. Such shape retention becomes progressively more difficult as frictional heat developed during pump operation softens the packing rings and predisposes them to extrusion under pressure through a gap (the extrusion gap) between the proximal adapter ring and the plunger.

A conflict thus arises when packing ring compression is increased. Increased compression may help to improve the plunger seal as well as to reduce migration of the packing ring material through the extrusion gap. But increased compression of the packing rings also results in generation of additional frictional heating that degrades the rings' functional integrity. Since dissipating this heat within the confines of the packing box is difficult, high pressure plunger pumps are often limited to relatively short periods of operation (e.g., no more than a few hours) to limit extrusion of the packing ring material through the extrusion gap. If pump run times are extended, packing rings tend to overheat and fail prematurely.

The above conflict has been partially resolved by replacing the proximal bronze adapter ring with a proximal anti-extrusion adapter ring comprising PEEK polymer in certain seals. PEEK (polyetheretherketone) is a high performance thermoplastic, a portion of which moves radially inward under longitudinal compression, tending to narrow the extrusion gap. See, e.g., U.S. Pat. No. 7,847,057 B2, incorporated by reference. Such radial inward (gap-narrowing) movement is termed "elongation" in industry advertising and is said to be more prominent in a PEEK adapter ring than in an analogous bronze adapter ring. While the use of commercially-available PEEK adapter rings appears to increase plunger packing service life, frictional wear and heat generation problems remain.

Additional remaining problems relate to the confounding effects of the time-varying character of pumped-fluid pressure. One pressure change in particular occurs as the suction valve quickly moves from full-open to closed (i.e., as a pump pressure stroke begins). Fluid flow through the valve changes direction momentarily and then stops abruptly. Since the pumped fluid is substantially incompressible, a high-amplitude fluid pressure transient is generated and virtually instantaneously transmitted from the suction valve to, among other sites, the plunger seal. This closing energy impulse can excite damaging vibration resonances in a pump while increasing the risk of extrusion damage to a conventional seal. But the vibration can be damped and the risk of extrusion damage can be reduced with a new approach to design and operation of the anti-extrusion member.

SUMMARY OF THE INVENTION

A multifunction ring symmetrical about a longitudinal axis has an elastomeric body, first and second ends, and inner and outer surfaces. The elastomeric body totally encloses at least one pair of longitudinally-spaced circumferential tubular cavities, each pair of cavities being mutually connected via a fluid flow restrictor and substantially filled with at least one fluid medium. Each fluid flow restrictor is responsive to longitudinal compression of the elastomeric body, and the fluid medium facilitates functions such as heat conduction, vibration damping, extrusion blocking and/or fluid pressure transmission.

Longitudinal compression of a multifunction ring on a pump pressure stroke increases tubular cavity fluid pressure and causes substantially symmetrical radial ring expansion to achieve ring functional objectives (e.g., extrusion blocking, etc.). Fluid flow resistance of each fluid flow restrictor is responsive to the resulting radial ring expansion (both inward and outward). Specifically, fluid flow resistance in each fluid flow restrictor is reduced during radial ring expansion due to the increase of flow cross-sectional area within the flow restrictor. This reduction in flow resistance increases the high-frequency response of a multifunction ring, leading to more effective extrusion blocking But the periodic reduction of pumped fluid pressure following a pressure stroke then tends to reverse radial ring expansion, thus reducing both frictional ring wear and heat generation peripherally while increasing fluid flow resistance in each fluid flow restrictor (which increases heat scavenging due to increased fluid turbulence).

Note that longitudinal compression of a multifunction ring's elastomeric body is generally due to a pressure wave in the pumped fluid. The pressure wave typically acts initially on whichever end of the ring is closest to the pumped fluid. And the time delay required for the pressure wave to traverse the longitudinal dimension of the ring means that the two longitudinally-spaced circumferential tubular cavities of each pair will be exposed to the pressure wave at slightly different times. That is, the peak pressures in each tubular cavity of a pair will be out of phase. Further because of energy loss (due, e.g., to fluid turbulence and/or hysteresis in the elastomeric ring body) as the pressure wave traverses the length of a ring, the peak pressures in adjacent tubular cavities will differ. Such peak pressure differences and/or phase shifts will result in time-varying fluid flow between the cavities of a pair via the fluid flow restrictor which provides fluid communication between the cavities. Energy lost as heat in a fluid flow restrictor, combined with the energy loss noted above, tends to reduce closing energy impulse peaks and damp the associated vibration. Simultaneously, the risk of extrusion damage is reduced by the earlier-noted rapid radial expansion of each multifunction ring on a pressure stroke.

To facilitate the above functions, a multifunction ring comprises an elastomeric body which totally encloses a plurality of circumferential tubular cavities substantially filled with a fluid medium. Each fluid medium may comprise various combinations of components (e.g., various gases and/or liquids with or without various types of inclusions such as colloidal particles), all of which are substantially indistinguishable in the schematic illustrations herein. So invention embodiments comprising such components and/or combinations are generally described herein using terminology found in U.S. patents and applications, while being illustrated only schematically. Thus, the schematic representation of "fluid medium" should be understood in each claim, drawing and/or description as representing the pertinent terminology used herein and/or analogous terminology incorporated by reference.

Note that the term "fluid" as used herein refers to a substance (e.g., gas or liquid) which generally takes the shape of its container. Since the pressure regime in which the invention may be employed is very wide (e.g., from ambient to about 15,000 psi) and operating temperatures may also vary substantially, a material termed a "fluid" for purposes of the invention might, for example, be gas, liquid or semi-solid at ambient pressure while flowing readily at a pressure of 15,000 psi. Thus, terms such as "fluid medium" or "dilatant liquid" or "shear-thickening liquid" or "working fluid" or related terms herein refer to substances having useful properties (e.g., viscosity, dilatancy, thermal conductivity, specific heat, etc.) for performance of one or more of the multifunction ring functions [e.g., conducting heat, damping vibration (including shock absorption), maintaining alignment, blocking extrusion (partially or completely), and/or transmitting fluid pressure] under various specified environmental conditions.

Note that heat transfer via a multifunction ring may be enhanced in certain ring embodiments by allowing the ring to act as a radial heat pipe. For example, a multifunction ring used as part of a plunger seal assembly may comprise a fluid medium which itself comprises the working fluid of a heat pipe. The inner surface of the ring would absorb heat from the plunger, and the adjacent portion of the ring's tubular cavity would function as an evaporator region. The condenser region of the radial heat pipe would be the tubular cavity portion adjacent to the ring's outer surface. Between the evaporator and condenser regions would lie an adiabatic region of the tubular cavity wherein the working fluid rapidly conveys heat across the radial dimension of the ring. See, e.g., U.S. Pat. No. 6,059,017, incorporated by reference. Note also that a multifunction ring comprising PEEK polymer is advantageous in certain plunger seal assemblies. See, e.g., the '057 patent.

Examples of several multifunction ring functions are seen when one or more multifunction rings are incorporated in seal assemblies. Longitudinal compression of the multifunction ring(s) secondary to increased pumped fluid pressure occurs during a pressure stroke. Such compression, acting through the longitudinal compliance of each multifunction ring, increases tubular cavity fluid pressure and causes substantially symmetrical radial ring expansion (i.e., a manifestation of radial ring compliance).

In general, multifunction ring expansion is both radially inward (e.g., toward a plunger when used in a plunger packing assembly) and, simultaneously, radially outward (e.g., toward a plunger seal packing box). Analogous inward and outward radial ring expansion is also seen in certain other applications (e.g., in a peripheral valve seal). In the latter case radial outward expansion tends to block the extrusion gap while inward expansion tends to strengthen the seal's spatial relationship to the valve body while maintaining or improving valve body alignment within a pump housing. In alternative applications (e.g., in a plunger seal assembly), radial inward expansion analogously tends to block the extrusion gap while maintaining or improving plunger alignment). And in any such applications, radial expansion increases coupling from a movable element to its surrounding structure, thus increasing hysteresis and/or fluid turbulence heat loss, which improves vibration damping and/or heat scavenging. Periodic reduction of pumped fluid pressure tends to reverse radial ring expansion, thus reducing both frictional ring wear and heat generation.

A multifunction ring as described herein can damp vibration via, for example, viscoelastic and/or shear-thickening liquids within the ring's tubular cavities (shear-thickening being a property which may be combined with other useful properties in dilatant materials). Thus, the fluid medium in each circumferential tubular cavity may comprise viscoelastic, shear-thickening and/or dilatant components. See, e.g., U.S. Pat. Nos. 7,794,827 B2; 6,713,438 B1; 5,629,503; and 5,183,863, as well as copending U.S. patent application Ser. No. 13/525,374, all incorporated by reference. Further, the mass of a movable element (e.g., a valve body or a plunger), when coupled to a pump's housing via certain viscoelastic and/or shear-thickening components of a multifunction ring, can act as part of a spring-mass vibration damper/shock absorber which is effective over a broad temperature (see the '863 patent).

To assist understanding of the invention, first, second and third embodiments are discussed only as illustrative examples. In a first invention embodiment, a multifunction ring is symmetrical about a longitudinal axis and has an elastomeric body, a first end, a second end, an inner surface, and an outer surface. The elastomeric body totally encloses at least one pair of longitudinally-spaced circumferential tubular cavities, and each pair of tubular cavities is mutually connected (i.e., in fluid communication) via a fluid flow restrictor and substantially filled with at least one fluid medium. Further, each fluid flow restrictor is responsive to longitudinal compression of the elastomeric body.

Each multifunction ring of the first embodiment comprises an elastomeric body which totally encloses at least one pair of circumferential tubular cavities. Each circumferential tubular cavity, in turn, is substantially filled with at least one fluid medium. That is, a fluid medium, but not necessarily the same fluid medium, substantially fills each circumferential tubular cavity, regardless of the number of tubular cavities. Each ring first end may, or may not, comprise a chevron-shaped circumferential depression, and all said tubular cavities may, or may not, have substantially equal enclosed volumes to achieve predetermined vibration damping and/or shock-absorption characteristics. And all tubular cavities may, or may not, be substantially equally spaced between the ring inner and outer surfaces to achieve predetermined ratios of inward-to-outward expansion under longitudinal compression. Further, for embodiments comprising a plurality of tubular cavity pairs, each such pair being in fluid communication via a fluid flow restrictor, the fluid flow resistance of any two such fluid flow restrictors may or may not differ. Fluid flow resistance of each such fluid flow restrictor may be individually specified to achieve predetermined vibration damping and/or shock-absorption characteristics.

Note that each invention embodiment at least implicitly addresses thermal conductivities of multifunction ring components in light of the heat-scavenging function of a multifunction ring. Metallic nanoparticles or analogous particulate species may be added to a fluid medium to enhance thermal conductivity. Another function of the multifunction ring (that of vibration damping) may be addressed in variations of each embodiment by further ensuring that at least one fluid medium comprises at least one shear-thickening liquid, dilatant liquid and/or viscoelastic liquid. Candidate dilatant liquids may, for example, comprise one or more particulate and/or fibrous fillers, as well as other materials related to dilatant characteristics (e.g., interpenetrating polymer networks).

Each fluid medium in each invention embodiment may comprise, for example, one or more oils (see, e.g., the '438 patent), which may additionally comprise nanoparticles (e.g., metallic nanoparticles) to enhance heat transfer. Nanoparticles may comprise, for example, copper, beryllium, titanium, nickel, iron, alloys or blends thereof, and carbon. The term nanoparticle may conveniently be defined as including particles having an average size of up to about 2000 nm. See, e.g., U.S. Pat. No. 6,432,320 B1, incorporated by reference. The first embodiment's elastomeric body may comprise polyaryletherketone (PAEK), for example, polyetheretherketone (PEEK). See, e.g., the '057 patent.

In a second invention embodiment, a multifunction ring is symmetrical about a longitudinal axis and has an elastomeric body, a first end, a second end, an inner surface, and an outer surface. The elastomeric body totally encloses at least one pair of longitudinally-spaced circumferential tubular cavities, and all of the tubular cavities are substantially equally spaced between the ring's inner and outer surfaces. Each pair of tubular cavities is mutually connected via a fluid flow restrictor and substantially filled with at least one fluid medium, and each fluid flow restrictor is responsive to longitudinal compression of the elastomeric body. As in the first invention embodiment, each ring first end may, or may not, comprise a chevron-shaped circumferential depression.

In a third invention embodiment, a multifunction ring is symmetrical about a longitudinal axis and has an elastomeric body, a first end, a second end, an inner surface, and an outer surface. The elastomeric body totally encloses at least one pair of longitudinally-spaced circumferential tubular cavities, and all of the tubular cavities have substantially equal enclosed volumes. Each pair of tubular cavities is mutually connected via a fluid flow restrictor and substantially filled with at least one fluid medium, and each fluid flow restrictor is responsive to longitudinal compression of said elastomeric body. As in the first invention embodiment, each ring first end may, or may not, comprise a chevron-shaped circumferential depression.

Note that variations of a third invention embodiment may comprise a plurality of circumferential tubular cavities wherein at least one of the tubular cavities is substantially filled with a dilatant or shear-thickening liquid. Thus, variations of the third embodiment include multifunction rings with elastomeric bodies having a plurality of tubular cavities wherein the fluid media in at least two tubular cavities differ from each other. Further, the three invention embodiments described above may appear singly or in combination with one or more other embodiments.

Note also that multifunction rings of the invention (or equivalents thereof) may be incorporated in plunger seal assemblies and valve seals. In such cases, the invention includes pumps and valves incorporating the rings.

Pressurization of a multifunction ring, or an assembly comprising one or more multifunction rings, is generally a combination of static and dynamic forces. Static pressurization can result from, e.g., tightening a nut, while dynamic pressurization can result from pressurized pumped fluid. Either pressurization tends to cause longitudinal compression of the multifunction ring(s) present through pressure transmitted longitudinally via the multifunction ring(s) themselves. Longitudinal compressive force applied to the multifunction ring(s) is then mediated via any seal assembly component(s) lying between the multifunction ring(s) and the pumped fluid. Thus the dynamic response of a seal assembly comprising one or more multifunction rings may be altered by changing the compliance of various seal assembly components and/or the compliance of the multifunction ring(s) and/or their coefficients of friction with structures they contact.

DETAILED DESCRIPTION

Figure 1:
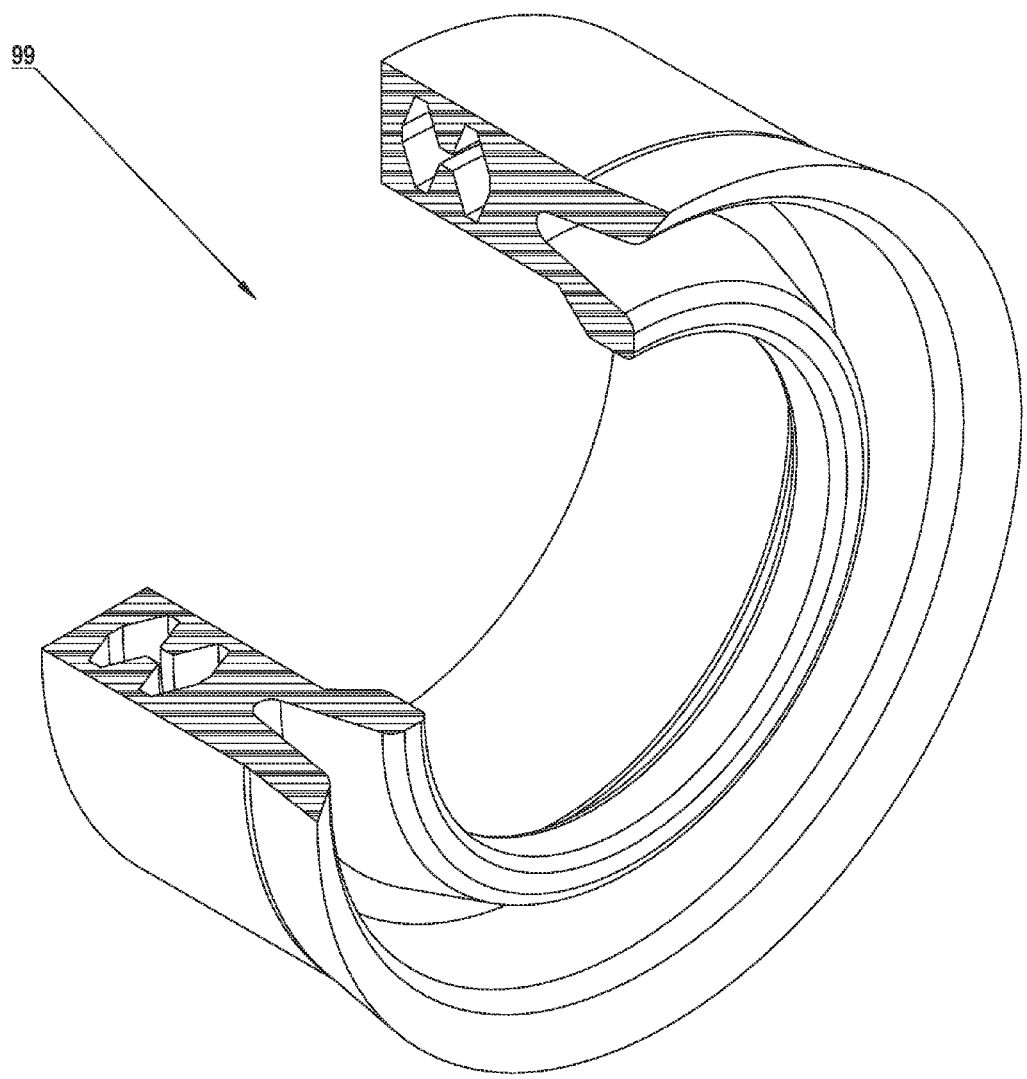
FIG. 1 is an enlarged 3-dimensional partial cross-sectional schematic view of a multifunction ring comprising a pair of longitudinally-spaced circumferential tubular cavities.
Figure 2:
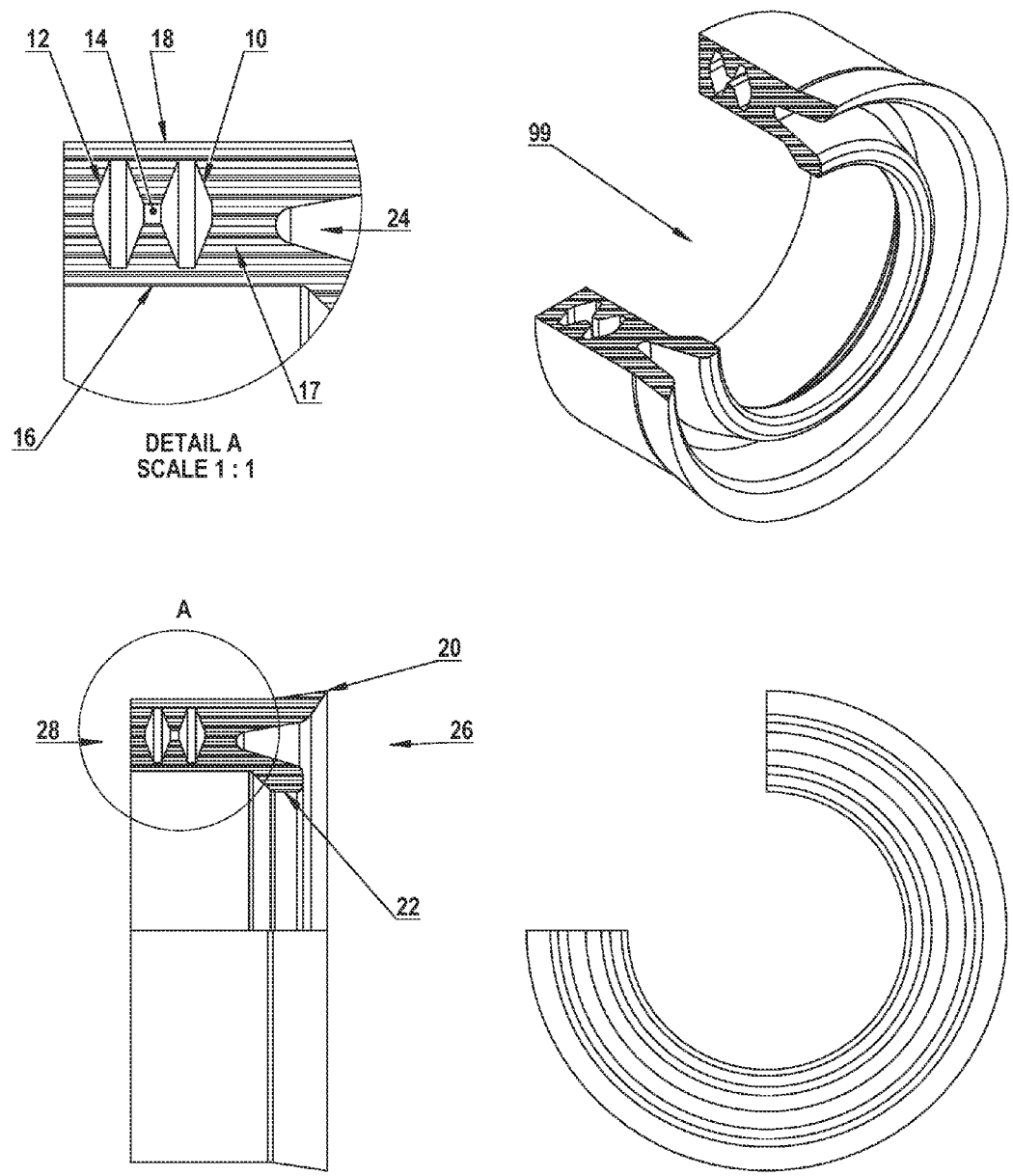
FIG. 2 schematically illustrates several views of the multifunction ring of FIG. 1, including breakout view A showing a portion of a chevron-shaped circumferential depression in one end of a multifunction ring, together with a longitudinally-spaced tubular cavity pair connected via a fluid flow restrictor.

FIG. 1 is an enlarged 3-dimensional partial cross-sectional view of a multifunction ring 99 comprising a pair of longitudinally-spaced circumferential tubular cavities 10 and 12 (see FIG. 2 for labeled features).

FIG. 2 schematically illustrates several views of the multifunction ring 99 of FIG. 1, including a breakout view showing the tubular cavity pair 10 and 12 connected via a fluid flow restrictor 14. The breakout view also shows a portion of a chevron-shaped circumferential depression 24 in first end 26 of multifunction ring 99. Also shown are the ring's elastomeric body 17, second end 28, inner surface 16, and outer surface 18. Elastomeric body 17 totally encloses one pair of longitudinally-spaced circumferential tubular cavities 10 and 12. Tubular cavities 10 and 12 are mutually connected (i.e., in fluid communication) via fluid flow restrictor 14 and substantially filled with at least one fluid medium 50 (see FIG. 3 for a sectioned instantaneous view of fluid medium 50).

FIG. 2 also schematically illustrates outer sealing lip 20 and inner flange 22. A sealing lip analogous to sealing lip 20 may be electively added to any portion of inner surface 16 and/or outer surface 18 to aid in centering and/or sealing functions of multifunction ring 99. On the other hand a flange analogous to flange 22 may also be added to any portion of inner surface 16 and/or outer surface 18 to further aid in centering and/or longitudinally stabilizing multifunction ring 99. Facilitating the latter function may be desired, for example, when a multifunction ring embodiment is configured to act as a peripheral valve seal.

Figure 3:
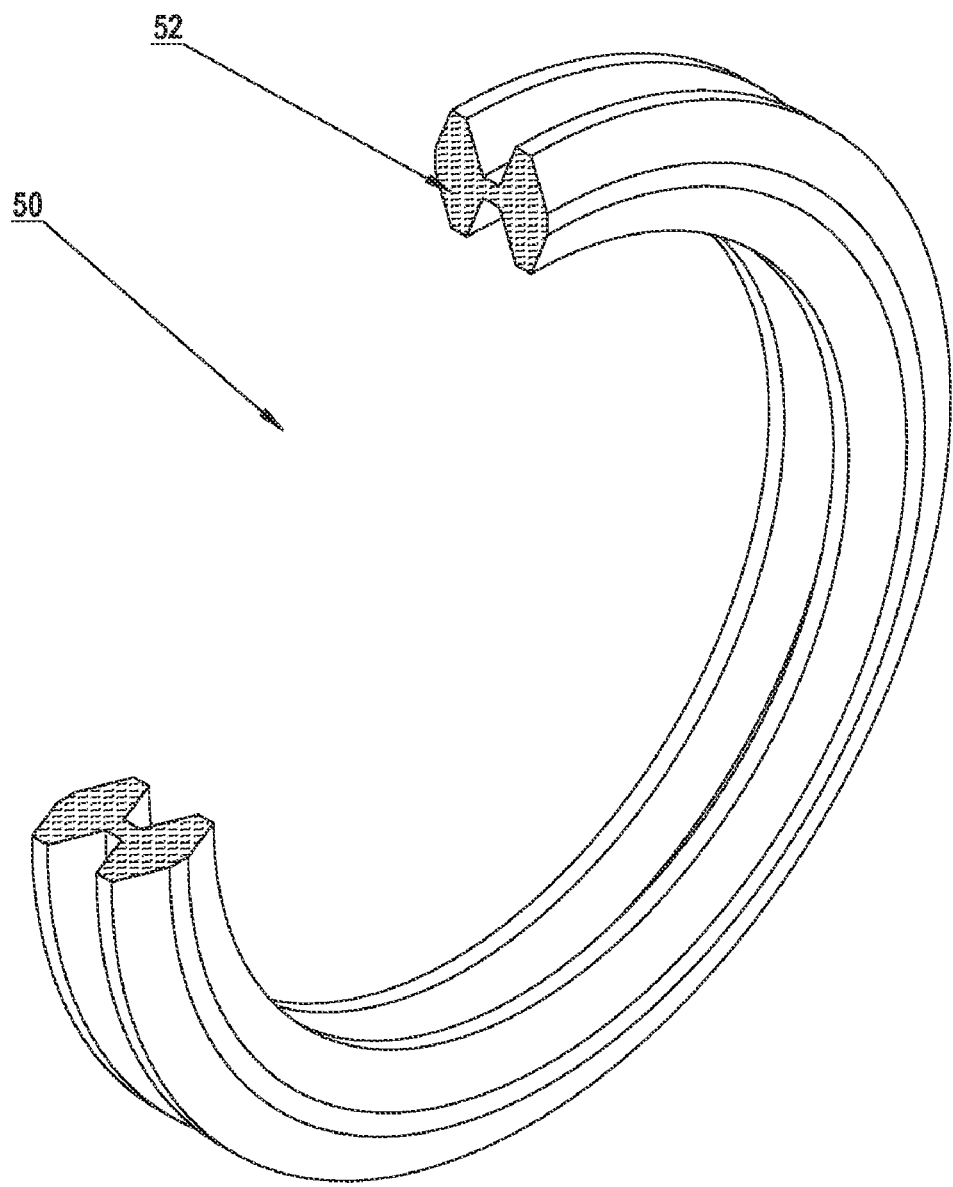
FIG. 3 is an instantaneous 3-dimensional partial cross-sectional schematic view of a fluid medium additionally comprising inclusions which typically could not be distinguished in a schematic view such as FIG. 3). The view schematically illustrates that the shape of the fluid medium within the circumferential tubular cavities and fluid flow restrictor of FIG. 1 or FIG. 2 closely reflects the shape of the circumferential tubular cavities and fluid flow restrictor of FIG. 1 or FIG. 2.

FIG. 3 is an instantaneous 3-dimensional partial cross-sectional view of fluid medium 50 additionally comprising inclusions 52 [e.g., particulate fillers, fibrous fillers, viscoelastic species, interpenetrating polymer networks, and/or nanoparticles (including metallic nanoparticles), and/or liquids (including shear-thickening liquids and/or dilatant liquids)]. The view schematically illustrates that the shape of the fluid medium 50 within the circumferential tubular cavities 10 and 12, as well as fluid flow restrictor 14 (see FIG. 2), closely conforms to the shape of the circumferential tubular cavities 10 and 12, as well as that of fluid flow restrictor 14. Inclusions 52 facilitate a multifunction ring's function(s) as part of a spring-mass vibration damper/shock absorber which is effective over a broad temperature range (see the '863 patent). Other multifunction ring functions that may electively be facilitated by appropriate addition of inclusions 52 to fluid medium 50 include (but are not limited to) conducting heat, maintaining alignment, damping vibration via fluid turbulence, blocking extrusion (partially or completely), and/or transmitting fluid pressure under various environmental conditions.

Figure 4:
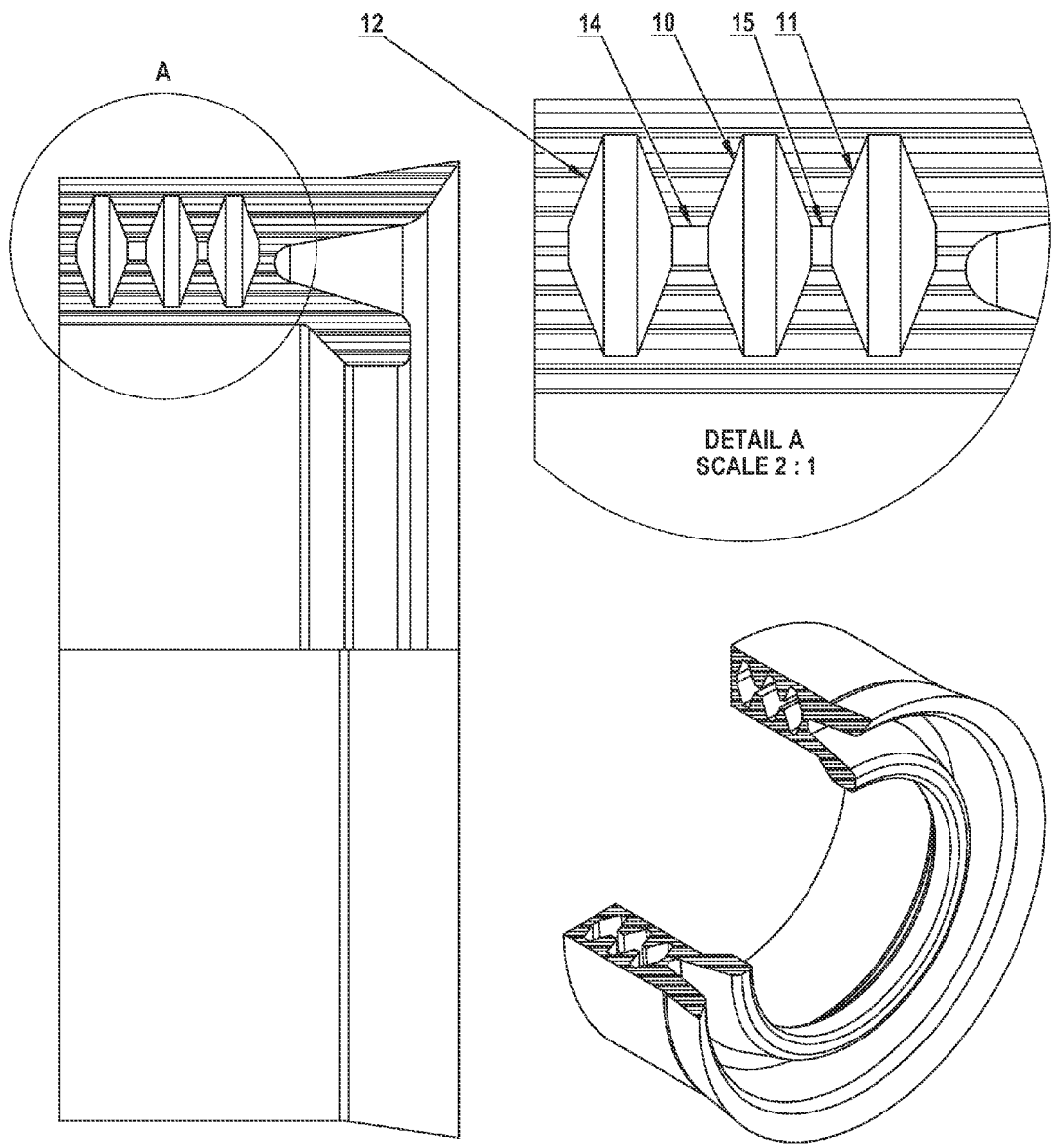
FIG. 4 schematically illustrates several views of an alternative embodiment of the multifunction ring of FIG. 1. Breakout view A shows first and second longitudinally-spaced tubular cavity pairs, each tubular cavity pair being mutually connected (i.e., in fluid communication) via first and second fluid flow restrictors respectively.

FIG. 4 schematically illustrates several views of an alternative embodiment of the multifunction ring of FIG. 2. Breakout view A shows a first longitudinally-spaced tubular cavity pair 10 and 12, together with a second longitudinally-spaced tubular cavity pair 10 and 11. Each tubular cavity pair is mutually connected (i.e., in fluid communication) via an individual fluid flow restrictor. That is, first tubular cavity pair 10 and 12 is mutually connected via fluid flow restrictor 14, while second tubular cavity pair 10 and 11 is mutually connected via fluid flow restrictor 15. Further, fluid flow restrictors 14 and 15 are schematically illustrated (by their different lengths) to indicate their generally differing fluid flow resistances. But both fluid flow restrictors 14 and 15 will experience radial expansion secondary to increased fluid pressures resulting from longitudinal compression of the multifunction ring. Thus, both fluid flow restrictors 14 and 15 are responsive to longitudinal compression of the multifunction ring's elastomeric body (though their respective fluid flow resistances may or may not be equal). Specific choices for the resistance characteristics of any fluid flow restrictor of the invention depend on design criteria relating to, for example, the frequency range of vibration damping and/or shock absorption chacteristics desired within a multifunction ring.

Note that dilatancy tends to momentarily stiffen the multifunction ring under the influence of a rapidly-rising pressure impulse, as may result from abrupt closure of a suction valve. Such stiffening serves to improve extrusion blocking at the peak of the pressure impulse, while relaxing the blocking function after the peak pressure has passed. Further, relaxation reduces frictional heating and wear when the requirement for greatest extrusion blocking has decreased due to a relative decrease in pumped fluid pressure.

Still other alternative invention embodiments exist in addition to those above. For example, a multifunction ring may comprise a plurality of pairs of longitudinally-spaced tubular cavities, each tubular cavity of a pair being in fluid communication with the other via a fluid flow restrictor. Each such fluid flow restrictor is responsive to longitudinal ring compression, which necessarily raises the internal fluid pressure of either or both tubular cavities of the pair. Further, a plurality of multifunction rings may be interspersed with conventional seal rings and/or other cooperating elements (e.g., rubberized fabric or analogous plunger packing rings) in various interspersed seal assemblies.

Interspersed seal assembly embodiments installed as plunger packing may thus function to narrow a plurality of extrusion gaps (i.e., one extrusion gap associated with each multifunction ring within the interspersed seal assembly). During a pump pressure stroke, the pumped fluid pressure will then be distributed over the longitudinal dimension of the seal assembly, with partial pressure differentials associated with each individual extrusion gap. While the total of the instantaneous partial pressure differentials at a given time approximates the total instantaneous pressure across the seal assembly at that time, each instantaneous partial pressure differential associated with an individual extrusion gap will be only a fraction of the total pumped fluid pressure. Thus, the tendencies toward seal extrusion as well as frictional heating and wear associated with each extrusion gap within the seal assembly will be reduced. Since both heat generation and heat scavenging are distributed over a longitudinal dimension of such a seal assembly as a whole, maximum temperatures experienced by any part of the seal assembly (and corresponding local temperature-related damage) will be reduced.

Note that embodiments of a multifunction ring may be molded in corresponding mating portions which are then laser welded together using techniques well known to those skilled in the art. The mating portions are chosen to reflect the disclosure herein. See, e.g., the '057 patent and U.S. Pat. No. 3,617,589 (incorporated herein by reference). Following the welding step, one or more holes may be drilled to access the interior tubular cavity, with subsequent filling of the tubular cavity with fluid medium and, if desired, inclusions such as nanoparticles. Subsequent welded closure of the drilled access holes will yield a circular multifunction ring substantially as described herein.

Note also that use of rapid-prototyping (i.e., layer-wise) techniques may be optional for certain multifunction ring embodiments. Such techniques may obviate the fluid-filling step above. See, e.g., the '057 patent and U.S. Pat. No. 3,617, 589, incorporated herein by reference.

What is claimed is:

1. A multifunction ring about a longitudinal axis and having an elastomeric body, a first end, a second end, an inner cylindrical surface, and an outer cylindrical surface;

wherein said elastomeric body totally encloses at least one pair of longitudinally-spaced circumferential tubular cavities;

wherein each said pair of tubular cavities is mutually connected via a fluid flow restrictor and substantially filled with at least one fluid medium comprising at least one liquid;

wherein each said fluid flow restrictor is responsive to longitudinal compression of said elastomeric body; and wherein all said tubular cavities are substantially equally spaced between said inner cylindrical surface and said outer cylindrical surface.

2. The multifunction ring of claim 1 wherein said ring first end comprises a chevron-shaped circumferential depression.

3. The multifunction ring of claim 1 wherein all said tubular cavities have substantially equal enclosed volumes.

4. The multifunction ring of claim 1 wherein at least one said fluid medium comprises at least one shear-thickening liquid.

5. The multifunction ring of claim 4 wherein at least one said shear-thickening liquid comprises at least one fibrous filler.

6. The multifunction ring of claim 1 wherein each said fluid medium additionally comprises metallic nanoparticles.

7. A pump comprising at least one multifunction ring of claim 1.

8. A valve comprising at least one multifunction ring of claim 1.

9. A multifunction ring symmetrical about a longitudinal axis and having an elastomeric body, a first end, a second end, an inner cylindrical surface, and an outer cylindrical surface;

wherein said elastomeric body totally encloses at least one pair of longitudinally-spaced circumferential tubular cavities;

wherein all said tubular cavities are substantially equally spaced between said ring inner cylindrical surface and said ring outer cylindrical surface;

wherein each said pair of tubular cavities is mutually connected via a fluid flow restrictor and substantially filled with at least one fluid medium comprising at least one liquid; and wherein each said fluid flow restrictor is responsive to longitudinal compression of said elastomeric body.

10. The multifunction ring of claim 9 wherein at least one said fluid medium comprises at least one shear-thickening liquid.

11. The multifunction ring of claim 10 wherein at least one said shear-thickening liquid comprises at least one particulate filler.

12. The multifunction ring of claim 10 wherein at least one said shear-thickening liquid comprises at least one fibrous filler.

13. The multifunction ring of claim 9 wherein said ring first end comprises a chevron-shaped circumferential depression.

14. A multifunction ring symmetrical about a longitudinal axis and having an elastomeric body, a first end, a second end, an inner cylindrical surface, and an outer cylindrical surface;

wherein said elastomeric body totally encloses at least one pair of longitudinally-spaced circumferential tubular cavities;

wherein all said tubular cavities have substantially equal enclosed volumes;

wherein all said tubular cavities are substantially equally spaced between said inner cylindrical surface and said outer cylindrical surface wherein each said pair of tubular cavities is mutually connected via a fluid flow restrictor and substantially filled with at least one fluid medium comprising at least one liquid; and wherein each said fluid flow restrictor is responsive to longitudinal compression of said elastomeric body.

15. The multifunction ring of claim 14 wherein said ring first end comprises a chevron-shaped circumferential depression.

16. The multifunction ring of claim 14 wherein at least one said fluid medium comprises at least one shear-thickening liquid.

17. A pump comprising at least one multifunction ring of claim 16.

* * * * *